Aug. 12, 1952     P. E. CLINGMAN     2,606,635

SEALING STRIP

Filed July 28, 1950

INVENTOR
PAUL E. CLINGMAN
By Willkie Hardman & Fehr
his ATTORNEYS

Patented Aug. 12, 1952

2,606,635

UNITED STATES PATENT OFFICE 2,606,635

SEALING STRIP

Paul E. Clingman, Dayton, Ohio, assignor to General Motors Corporation, Detroit, Mich., a corporation of Delaware Application July 28, 1950, Serial No. 176,413

2 Claims. (Cl. 189—78)

1

This invention relates to resilient mounting strips of rubber or rubber-like material which form a weather-proof joint between a glass or other panel and a support upon which it is mounted.

The mounting strip of this invention is particularly useful for resiliently mounting the glass windshield or rear window of an automobile body upon the adjacent supporting metal body members.

An object of this invention is to provide an improved form of such a resilient mounting strip having grooves therein into which the connected glass panel and body member project and having in addition thereto two projecting flexible rubber sealing lips which are folded inwardly against each other and pressed against some portion of the body member when the strip is assembled in place upon the connected parts. Then two folded sealing lips fit neatly together and in effect form a closed hollow channel having a sealing action similar to that of an integrally formed resilient hollow bulb. However such a strip having a one-piece closed hollow bulb can be made by the usual extruding method only with difficulty and complications of the extrusion die, whereas the strip of this invention can be very simple and economically made by the extruding method since the two projecting sealing lips are not joined together at their tips at the time of extrusion and therefore each lip can be separately formed by extrusion in the same way any other projecting single lip can be simply formed by extrusion. The simplicity and economy of manufacture of applicant's strip is an important feature of this invention.

Also applicant's two separate sealing lips are folded together and overlap each other to the extent required by the actual space to be occupied by said lips when the strip is assembled upon the connected parts, in other words, applicant's separate sealing lips provide an effectively closed hollow channel which automatically adjusts its size to the space to be filled thereby, which space usually varies along the length of the strip. Hence applicant's strip still will perform its normal sealing functions thru quite a wide variation of dimensions in the space occupied by said lips. This capability of applicant's strip to automatically adjust itself to take care of substantial variations in the distance between the parts to be connected thereby is another important feature of his invention.

Further objects and advantages of the present invention will be apparent from the following description, reference being had to the accompanying drawing, wherein a preferred embodiment of the present invention is clearly shown.

In the drawings:

Fig. 2 shows the section to which all the flexible rubber lips and wings are inherently urged to return after it is assembled to the connected parts.

Figure 2:
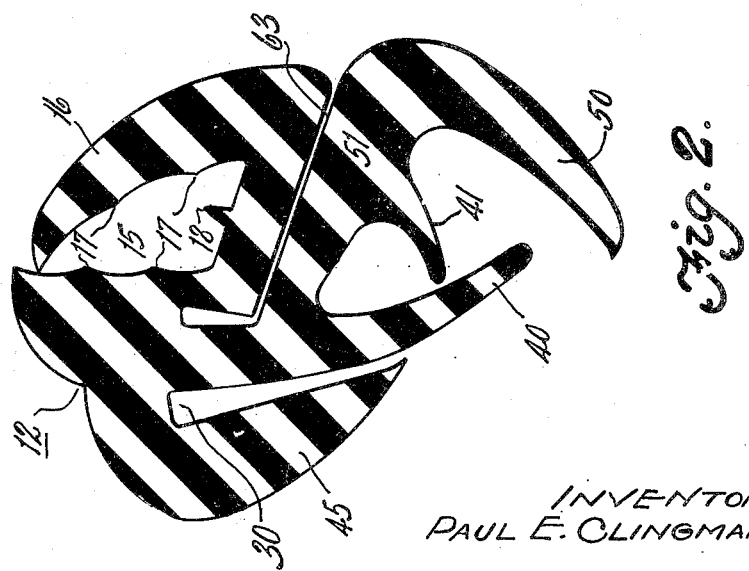
Fig. 2 is a cross section thru this strip and shows it in its unstressed form just prior to assembling it as shown in Fig. 1, that is.

Reference numeral 10 designates the glass pane which is resiliently supported upon the sheet metal support 11 by the intervening cushioning and sealing strip 12 made of resilient rubber or rubber-like material. This strip 12 is made in long lengths having a uniform section by extruding the uncured compounded material thru an extrusion die in a well known manner. Fig. 2 shows the undistorted shape of the section after the strip is cured and ready to be assembled upon the connected parts. This strip has a large groove 15 which fits snugly upon the marginal edge of glass pane 10. The flexible lip 16 is flexed outwardly to permit the glass pane to enter groove 15 and thereafter said lip 16 tends to return to its unstressed position and so is urged into sealing relation with the glass surface. The surfaces of the upstanding walls of groove 15 are shown as having small continuous ridges 17 which are pressed against the glass surface and thus provide a more effective sealing contact between the glass surface and the walls of groove 15. The bottom wall of groove 15 is shown as having a tapered projection 18 of such suitable length as to yieldably engage the bottom edge of the glass pane 10 and thereby provide an additional seal at this point.

Figure 1:
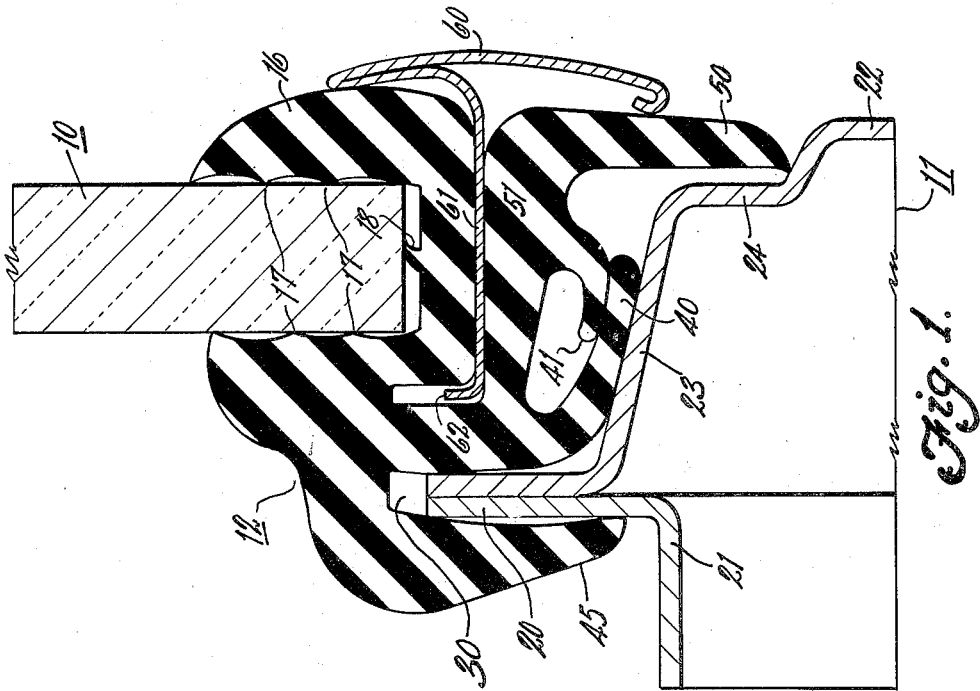
Fig. 1 is a cross section thru the strip of this invention (enlarged about four times) showing it assembled in place and connecting a glass window pane to the supporting sheet metal parts of an automobile body.

In the particular form shown in Fig. 1, the sheet metal support 11 has an upwardly projecting flange or pinch-weld 20 formed by the margins of sheet metal portions 21 and 22 being welded together, according to customary automobile body construction. Sheet metal portion 22 has an inclined shoulder portion 23 and a nearly vertical portion 24. The several wings and lips of the rubber strip 12 are designed to properly seat and snugly fit upon these sheet metal portions. Strip 12 has an inclined groove 30 (see Fig. 2) of correct dimensions to snugly receive the pinch-weld 20.

An important feature of this invention results from the two angularly projecting lips 40 and 41 shown in Fig. 2 in their normal or unstressed relative positions. It will be noted that the longer lip 40 extends past the tip of the shorter lip 41 and these two lips are so designed that when said longer lip is pressed upwardly (as viewed in Fig. 2) it will automatically fold and nest around the shorter lip 41, whereby the two lips together will in effect provide a closed hollow bulb. This occurs when the strip 12 is assembled upon the connected parts, as shown in Fig. 1.

The parts may be assembled as follows: the strip 12 is first applied to the glass pane 10 with the glass fitting snugly in its groove 15. Then the glass pane and strip are moved as a unit laterally into position in the opening therefor in the automobile body, the margin of said opening being represented by the sheet metal parts shown in Fig. 2. The flexible rubber wing 45 is sufficiently flexible to be flexed (to the left as viewed in Fig. 1) out of the way and permit the pinchweld 20 to be located within its groove 30. Now when strip 12 is moved laterally toward pinchweld 20, the tip end of the longer lip 40 engages the metal shoulder portion 23 and is automatically folded inwardly thereby so as to fold around and snugly nest upon the shorter lip 41, as shown in Fig. 1. Thus the two lips 40 and 41 when folded together mutually reinforce each other and in effect provide a self-adjusting hollow sealing bulb which automatically adjusts its size to properly seal the joint between the strip 12 and the metal shoulder 23. It will be noted that such a hollow sealing bulb will be provided even though the distance between the bottom edge of glass pane 10 and the upper surface of shoulder 23 may vary considerably. This self-adjusting feature has great practical importance in automobile body construction because it has been found difficult and expensive to hold the dimensions of the window opening in the body and of the glass pane to close tolerance limits.

When the parts are moved to the relative positions shown in Fig. 1, the flexible wing 50 is distorted from its normal position (shown in Fig. 2) by being pressed laterally against the sheet metal portion 24. Thus wing 50 aids in properly locating and anchoring the base portion 51 which supports the shorter lip 41, and also provides an additional seal between strip 12 and the sheet metal frame or support 11.

60 is a flexible metal trim strip which is held in place by its flange 61 having a small upturned flange 62 on its inner end which is inserted within the narrow groove 63 provided in the body of strip 12. This metal strip 60 when snugly inserted into its retaining groove 63 will obviously aid in supporting flexible wing 16 in its correct position and resist outward flexure thereof when glass pane 10 is forced to the right (as viewed in Fig. 1). Also trim strip 60 aids in supporting wing 50.

The particular details of the lower portion of the strip 12 illustrated in the drawings are specially designed to fit snugly upon the particular design of the sheet metal frame 11. Of course for other designs of the supporting metal frame the lower portions of strip 12 can be readily changed to fit the particular design of frame 11 with which it will be used. The most important novel feature of the strip of this invention is the self-adjusting hollow sealing bulb formed by folding the two separate lips 40 and 41 together at the time of assembling the strip to its connected parts.

While the embodiment of the present invention as herein disclosed, constitutes a preferred form, it is to be understood that other forms might be adopted.

What is claimed is as follows:

1. A connecting strip of uniform cross section formed of resilient deformable material, said strip having a longitudinal groove for receiving a supporting member and a second longitudinal groove for receiving a member to be supported, said strip also having two laterally extending lips inclined towards each other and forming therebetween a longitudinal hollow slightly open thruout its length, one of said lips being longer than and overlapping the other lip when the strip is assembled on the supporting member, said overlapping lips forming a longitudinally extending space sealed thruout its length and varying in size according to the space between the supporting and supported members.

2. The combination of claim 1 wherein the strip is provided wtih a third groove for receiving a trim strip.

PAUL E. CLINGMAN.

REFERENCES CITED

The following references are of record in the file of this patent:

UNITED STATES PATENTS

| Number | Name | Date |
|---|---|---|
| 1,497,140 | Green | June 10, 1924 |
| 1,594,765 | Axe | Aug. 3, 1926 |
| 2,163,566 | Blessin | June 20, 1939 |
| 2,167,974 | Edwards | Aug. 1, 1939 |